United States Patent
Gross

(10) Patent No.: US 7,930,993 B2
(45) Date of Patent: Apr. 26, 2011

(54) DISPENSER DEVICE WITH REMOTE-CONTROLLED DISPENSER FOR THE RELEASE OF DISPENSER MATERIALS FOR AN ANIMAL AND CORRESPONDING METHOD

(76) Inventor: Fritz Gross, Stuttgart (DE)

( * ) Notice: Subject to any disclaimer, the term of this patent is extended or adjusted under 35 U.S.C. 154(b) by 423 days.

(21) Appl. No.: 11/912,890

(22) PCT Filed: May 2, 2006

(86) PCT No.: PCT/DE2006/000839
§ 371 (c)(1),
(2), (4) Date: Oct. 27, 2007

(87) PCT Pub. No.: WO2006/116994
PCT Pub. Date: Nov. 9, 2006

(65) Prior Publication Data
US 2008/0202446 A1    Aug. 28, 2008

(30) Foreign Application Priority Data

| May 4, 2005 | (DE) | 10 2005 021 878 |
| Jun. 24, 2005 | (DE) | 20 2005 010 461 U |
| Jul. 7, 2005 | (DE) | 20 2005 010 805 U |
| Jul. 19, 2005 | (DE) | 20 2005 011 651 U |
| Feb. 5, 2006 | (DE) | 20 2006 002 067 U |

(51) Int. Cl.
*A01K 5/02* (2006.01)
(52) U.S. Cl. ............ 119/51.02; 119/720; 119/905; 119/908
(58) Field of Classification Search ........ 119/51.01, 119/51.5, 51.02, 52.1, 51.04, 53, 51.11, 720, 119/57.1, 719, 57.92, 905, 908; 232/43.1, 43.2, 43.3; 221/9, 10, 12, 13, 64
See application file for complete search history.

(56) References Cited

U.S. PATENT DOCUMENTS

| 4,627,385 | A | 12/1986 | Vinci | |
| 5,046,453 | A | 9/1991 | Vinci | |
| 6,415,742 | B1 | 7/2002 | Lee et al. | |
| 6,718,911 | B2 * | 4/2004 | Greenberg | 119/51.5 |
| 6,886,739 | B1 | 5/2005 | Tsengas | |
| 7,434,541 | B2 * | 10/2008 | Kates | 119/720 |
| 2003/0057228 | A1 * | 3/2003 | Brown et al. | 221/185 |
| 2005/0224003 | A1 * | 10/2005 | Yin et al. | 119/61.5 |

FOREIGN PATENT DOCUMENTS
DE 20011847 U1 10/2000
* cited by examiner

*Primary Examiner* — T. Nguyen
(74) *Attorney, Agent, or Firm* — Brooks Kushman P.C.

(57) ABSTRACT

The invention relates to a dispenser device, in particular, a reward dispenser device, comprising at least one dispenser for the release of a dispenser material for an animal, in particular, a dog, whereby the dispenser is provided with at least one dispenser material housing and a fixing device for the carrying thereof. According to the invention, the dispenser device (52) comprises the dispenser (3) and at least one signal emitter (45), the dispenser (3) has a release mechanism (31) for the release of the or a part of the dispenser material (21), operated by remote control, in order to carry the dispenser (3) on the animal (1) the fixing device (5) is embodied as an animal fixing device (4) and the signal emitter (45), not carried by the animal (1), is embodied for the remote control operation of the release mechanism (31).

27 Claims, 4 Drawing Sheets

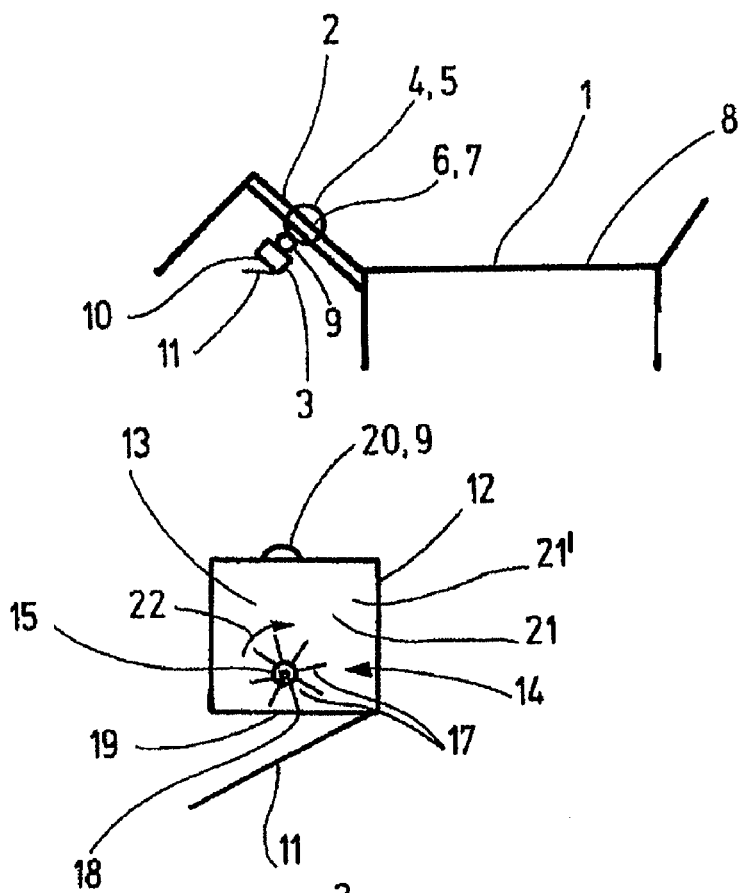
Fig. 1a
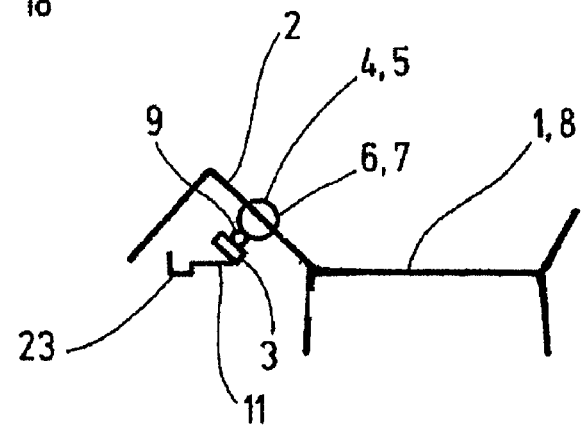
Fig. 1b
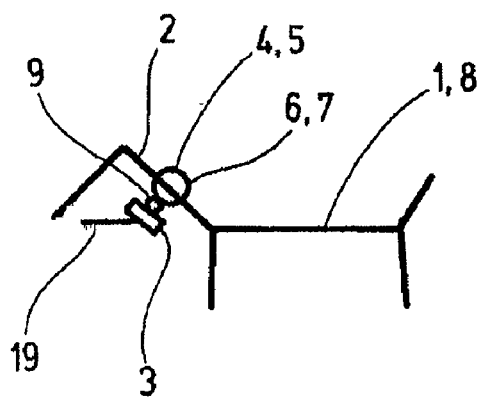
Fig. 1c
Fig. 1d

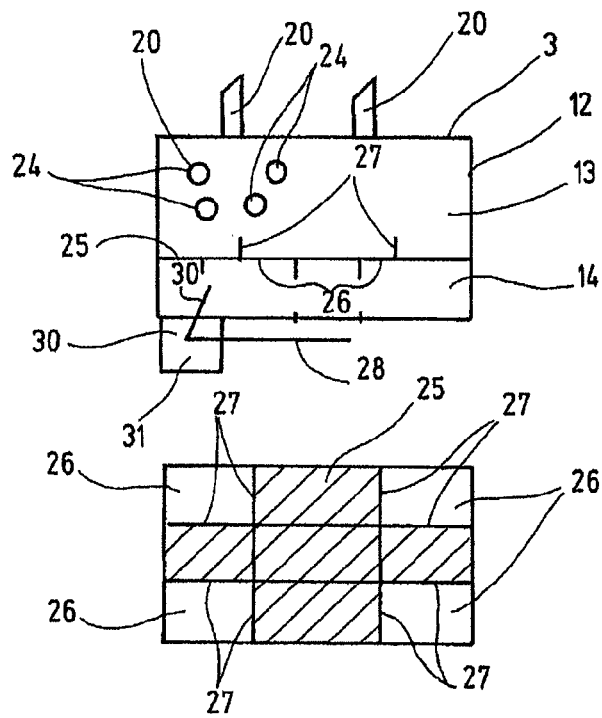
Fig.2a
Fig.2b
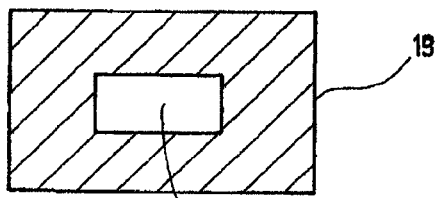
Fig.2c
Fig.2d
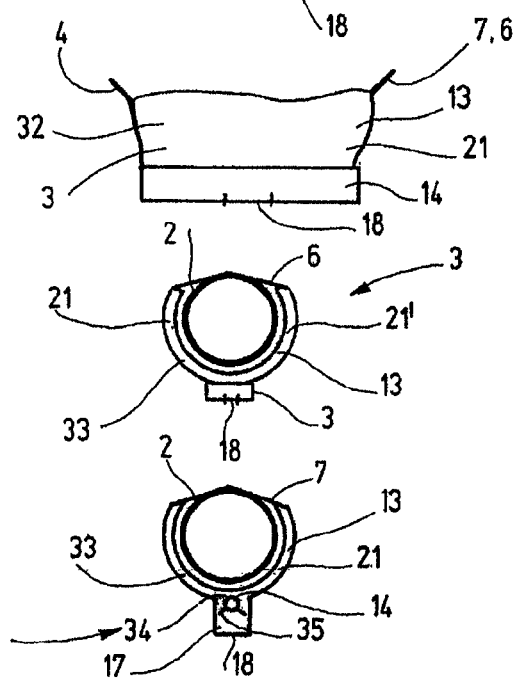
Fig.2e
Fig.2f

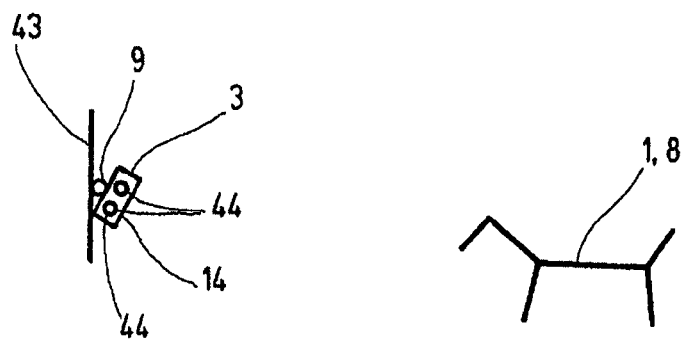
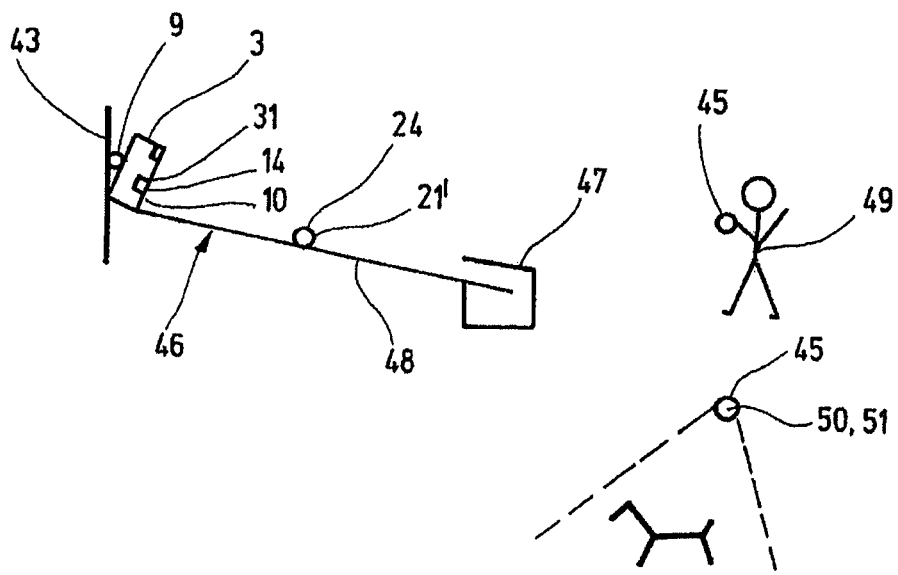
Fig.4a
Fig.4b
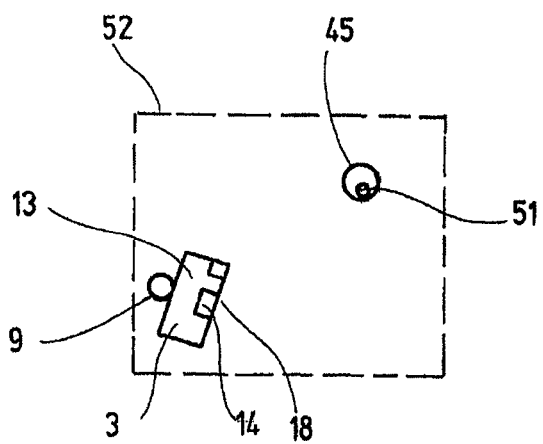
Fig.4c

DISPENSER DEVICE WITH REMOTE-CONTROLLED DISPENSER FOR THE RELEASE OF DISPENSER MATERIALS FOR AN ANIMAL AND CORRESPONDING METHOD

The invention relates to a dispenser device, in particular a reward dispenser device, comprising at least one dispenser for releasing a dispenser material for an animal, in particular for a dog, with the dispenser being equipped with at least one dispenser material receptacle and with a fixing device for carrying purposes.

A dispenser device of the abovementioned type is known. It comprises a portable dispenser with a dispenser material receptacle and a fixing device, for example a clip, which allows a person to carry the dispenser without limiting the freedom of movement of the person. If the person—also called the trainer in the text which follows—wishes to give the dispenser material or part of the dispenser material to the animal, said person opens the dispenser and can remove the dispenser material from the dispenser material receptacle and release it to the animal, for example by throwing it to said animal. If the animal is to receive the dispenser material specifically as a reward, it is essential that the dispenser material be dispensed at the correct moment since the animal cannot connect two events which are too far apart from one another in terms of time. In order to be able to recognize the relationship between his action and the release of the reward, the dispenser material in the form of a reward has to be released immediately following the action of the animal which is to be rewarded. Corresponding training of the animal can only be successful if this is the case.

The invention is based on the object of producing a dispenser device of the abovementioned type in which the dispenser material is made directly accessible to the animal at a time which can be determined by the trainer, in order to achieve the desired training result.

This object is achieved in that the dispenser device has the dispenser and at least one signal transmitter, in that the dispenser has a release mechanism, which can be operated by remote control, for releasing the or a proportion of the dispenser material, in that the fixing device is designed as a fixing device for animals for the purpose of carrying the dispenser on the animal, and in that the signal transmitter, which is not to be carried by the animal, is designed for remote-controlled operation of the release mechanism. It is essential here that, with a dispenser device of this type, in contrast to a dispenser device which is known from the prior art, the dispenser is carried on the fixing device for animals by the animal itself and can be operated in a remote-controlled manner by means of the signal transmitter. Using this dispensing device, it is possible to release the dispenser material independently of the physical distance between the signal transmitter and the dispenser. It permits immediate operation of the release mechanism of the dispenser by remote action, with the release site of the dispenser material changing with the position of the animal. Using a dispenser device of this type, a trainer can directly give the or a proportion of the dispensing material to the animal. In the process, the animal connects the release of the dispenser material primarily with the prevailing situation and not with the trainer or interaction with the trainer.

One development of the invention provides for dispenser material to be food, in particular reward food, and/or a toy. Dispenser material in the form of food or a suitable toy is seen as a reward by the animal.

Furthermore, one development of the invention provides for the dispenser material to be released in an area surrounding the animal. This additional measure has the advantage that the dispenser material is immediately accessible to the animal and the animal does not have to perform any further action which distracts it from the situation to be rewarded. When the dispenser material is released in this way, said dispenser material can fall onto the floor, for example in front of the animal, or be thrown into the perception zone of the animal.

One development of the invention provides for the dispenser to have a collection container for collecting the released dispenser material, which collection container can be reached by the animal. A collection container of this type increases the acceptance of the dispenser by the animal and ensures that the animal can easily find the dispenser material, even when ground conditions are poor.

According to one development of the invention, provision is made for the fixing device for animals to be designed as a separate fixing harness. The dispenser is fixed to this fixing harness. The fixing harness may be a fixing harness which is already present and, for example, is used to attach a lead.

Provision is particularly made for the fixing harness to be a collar or a chest harness. These types of fixing harnesses are known for many types of animal.

Provision is further made for the dispenser to be fixed to the fixing device for animals by means of at least one intermediate element in a fixable manner. An intermediate element, which acts as an adapter, is required for fixing purposes, particularly in the case of fixing harnesses which do not only serve to fix the dispenser.

Provision is particularly made for the intermediate element to be a carabiner, a lug or a touch-and-close fastener strip.

According to one development of the invention, provision is made for the remote control to operate wirelessly, in particular by means of radio, infrared or ultrasound. A sufficiently large operating range is ensured in the case of remote-control operations which are based on these transmission methods. In this case, wireless signal transmission ensures maximum flexibility for the animal and the trainer.

Provision is particularly made for the signal transmitter to have a transmitter and for the dispenser to have a receiver for remote-controlled operation.

Provision is further made for it to be possible to operate the signal transmitter by a triggering device.

Provision is particularly made for the triggering device to trigger the signal transmitter as a function of at least one triggering signal which is in the form of a manual press of a finger, time switch signal, motion detector signal or position detection signal. In addition to manual triggering by the trainer (which corresponds to remote control), the release mechanism of the dispenser can also be triggered by other input signals from the signal transmitter. These signals can be triggered by the environment—that is to say independently of the animal or the trainer—or, for example, by the animal itself by means of a motion detector signal or position detection signal.

Provision is further made for the dispenser and the signal transmitter to be electrically operated and to each have at least one electrical storage means for electrical power supply purposes. Since the two constituent parts of the dispenser device (signal transmitter and dispenser) are used in a mobile manner, their voltage supply is preferably ensured by an electrical storage means, for example a battery or a storage battery.

Provision is further made for the dispenser to have at least one electric motor for driving the release mechanism.

According to one development of the invention, provision is made for the dispenser material to be preportioned dispenser material. Said preportioned dispenser material may be, for example, dry food which is pressed into balls or pellets.

Provision is particularly made for the release mechanism to be part of a portioning device with which the dispenser material can be released in portions. If not all of the dispensing material is to be released from the dispenser material receptacle "in one go", a portioning device divides the dispenser material and releases it in a portioned manner via the release mechanism.

According to one development of the invention, provision is made for the portioning device to have at least one portioning container. In this case, the volume of the portioning container prespecifies the size of the portion. In this case, the portioning device may have a plurality of portioning containers—in particular of different sizes—, so that portions of different sizes can be released by the release mechanism.

Provision is particularly made for the dispenser material to be transported from the dispenser material receptacle to a release region in portions using the portioning device. In order to release the portioned dispenser material, some of the dispenser material is removed from the dispenser material receptacle by the portioning device and moved to a release region. To this end, the portioning container is first brought into contact with the dispenser material receptacle, so that some of the dispenser material is filled into the portioning container. The portioning container is then brought into contact with the release region in order to release the contents of the portioning container via the release mechanism.

Provision is further made for the portioning device to have a spindle for transporting the dispenser material. Using a spindle, linear transportation of the dispenser material can be easily generated from a rotary movement of the drive.

Provision is particularly made for the dispenser material receptacle to have a closable filling opening. The dispenser material receptacle is filled through this filling opening.

According to one development of the invention, provision is made for the dispenser to have at least one stimulus transmitter which emits an additional stimulus to the animal at the same time as the dispenser material or a portion of the dispenser material is released. The corresponding stimulus indicates to the animal that dispenser material has been released, so that the animal quickly learns to look for the portion of dispenser material.

Provision is particularly made for the stimulus to be a visual stimulus, an audible stimulus, a vibration stimulus, a blast of air or a contact stimulus. Stimuli of this type are suitable for attracting the attention of the animal.

The invention also relates to a method, in particular a reward method, for releasing a dispenser material from a dispenser material receptacle of at least one carried dispenser to an animal, in particular to a dog. In this case, provision is made for the animal to carry the dispenser on a fixing device for animals, and for the dispenser to have a release mechanism for releasing the or a proportion of the dispenser material, said release mechanism being operated in a remote-controlled manner by at least one signal transmitter which is not carried by the animal.

According to one development of the invention, provision is made for the dispenser material to be released in an operating range of the signal transmitter independently of the position of the animal. The independence of location of the trainer when dispenser material is released makes it easier for the animal to understand the relationship between the prevailing situation and the release of the dispenser material.

It is also advantageous for the dispenser material to be released immediately when the remote control is operated. Particularly good training results can be achieved with the smallest possible time delay in releasing the dispenser material.

It is further advantageous if the dispenser material is released into the immediate surroundings of the animal. As a result, the animal does not connect the releasing of dispenser material with a specific location or a specific trainer.

Finally, it is advantageous for the dispenser material to be released to reward the behavior of the animal. By means of corresponding training, which is based on the positive recognition by this reward method, the animal can be trained to behave in a desired manner.

The invention is explained in greater detail in the text which follows using a plurality of exemplary embodiments with reference to the associated drawings, in which:

FIGS. 1a to 1d show possible embodiments of a dispenser and its fixing,

FIGS. 2a to 2f show possible embodiments of the dispenser with an alternative release mechanism, FIGS. 4a to 4c show a dispenser apparatus with a dispenser and signal transmitter and possible applications.

Figure 3A:
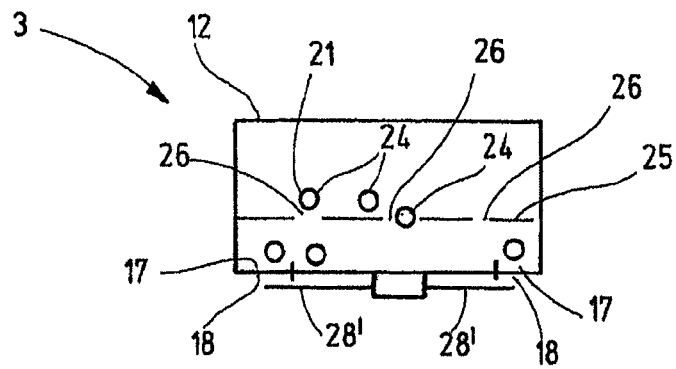
FIGS. 3a to 3d show further embodiments of the dispenser and its release mechanism.

FIG. 1a shows a schematic illustration of an animal 1 which has a dispenser 3 attached to its neck 2 by means of a fixing device 5 which is designed as a fixing device 4 for animals. The fixing device 4 for animals can, for example, be designed as a separate fixing harness 6, with the fixing harness 6 illustrated in FIG. 1a being a collar 7 of a dog 8. An intermediate element 9, with which the dispenser 3 is fixed to the fixing harness 6 which is designed as a collar 7, is located between the collar 7 and the dispenser 3. The release region 10 of the dispenser 3 which is illustrated in FIG. 1b is located on a side of the dispenser 3 which is opposite the intermediate element 9. A guide rail 11 is fitted beneath this release region 10. FIG. 1b shows further details of the dispenser 3. The dispenser 3 has a housing 12 in which a dispenser material receptacle 13 and a portioning device 14 are located. The portioning device 14 comprises an impeller wheel 15 which creates a portioning container 17 between its blades 16 in each case. Beneath the impeller wheel 15, the housing 12 has an opening 18 which forms the release region 10 of the dispenser 3. An intermediate element 9 which is designed as a lug 20 and by which the dispenser 3 can be fixed to the fixing harness 6 is arranged in the upper external region of the housing 12.

The dispenser 3 functions as follows: the dispenser material receptacle 13 contains a dispenser material 21 which passes into the portioning container 17 (compartments 17') of the impeller wheel 15 and is transported to the release region 10 by rotation of the impeller wheel (arrow 22). In this case, the dispenser material 21 is, in particular, food 21' for the animal. In the release region 10, the dispenser material 21 falls out of the opening 18 and onto the guide rail 11 in portions, in order to thus pass directly into an area surrounding the animal 1 which can be easily reached by said animal.

FIG. 1c shows a dispenser 3 with a guide rail 11, in which a collection container 23 is fitted to the end of the guide rail. A dispensing material 21 which is released by the dispenser 3 is conducted along the guide rail 11 and as far as the collection container 23 after being released from the opening 18. FIG. 1d shows an arrangement which corresponds substantially to FIG. 1a, with the guide rail 11 being replaced by an extendable rod 19 which guides the dispenser material 21, for example, as far as the mouth, the muzzle etc. of the animal 1.

FIGS. 2a to 2c show the schematic illustration of a further exemplary embodiment of the dispenser 3. FIG. 2a shows a section through the dispenser 3 which, in its upper end region, has two lugs 20 for being fixed to the fixing harness 6. In the upper part, the interior of the housing 12 contains the dispenser receptacle 13 with preportioned dispenser material 24. The dispenser material receptacle 13 is separated from a portioning device 14, which is located beneath the dispenser material receptacle 13, by an intermediate wall 25 with openings 26. A base region 19 of the portioning device 14 contains the release opening 18 which can be opened/closed by a flap 28 or a slide 28'. To this end, the flap 28 or the slide 28' are pivoted or displaced by an electric drive 30 which is designed as an electric motor 29. In this case, the electric drive 30 can move the dispenser material 21 (in the portioning device 14 or in the dispenser material receptacle 13) by means of a movement element 30' in the interior of the dispenser 3, in order to prevent wedging of the dispenser material 21—in particular the preportioned dispenser material 24. The development of noise by the electric drive 30 can be used as an audible stimulus when releasing the dispenser material 21.

The dispenser 3 functions as follows: due to the movement of the animal 1, preportioned dispenser material 24 passes into the portioning device 14 through the openings 26 which are selected to be suitably large. The electric motor 29, which opens the flap 28 or the slide 28' for a certain time, is actuated by remote-controlled operation of the release mechanism 31. During this time, preportioned dispensing material 24 passes—in a manner delayed by the intermediate wall 25—into the release region 10 by means of the portioning device 14.

FIGS. 2d to 2f show specific embodiments of the dispenser material receptacle 13. In FIG. 2d, the dispenser material receptacle 13 is designed as a bag 32. In FIGS. 2e and 2f, the dispenser material receptacle 13 is designed as at least one hose 33 which runs along the right and left of the fixing harness 6 and is fixed to said fixing harness. An embodiment in which the fixing device 4 for animals has the dispenser material receptacle 13 in the form of a hose 33 is also possible. FIG. 2f shows a release mechanism 31 of the dispenser 3, which release mechanism is different from FIG. 2e, in which the preportioned dispenser material 24 is released by a servo 34 whose lever 35 can move to the right and left and alternately releases dispenser material 21 from both sides of the dispenser material receptacle 13 which is fixed to the fixing harness 6, this dispenser material passing to the release region 10—for example by means of a portioning device 14.

Figure 3B:
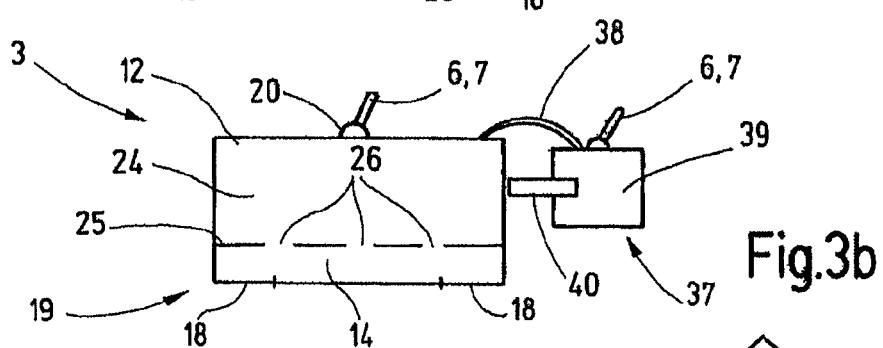
Figure 3C:
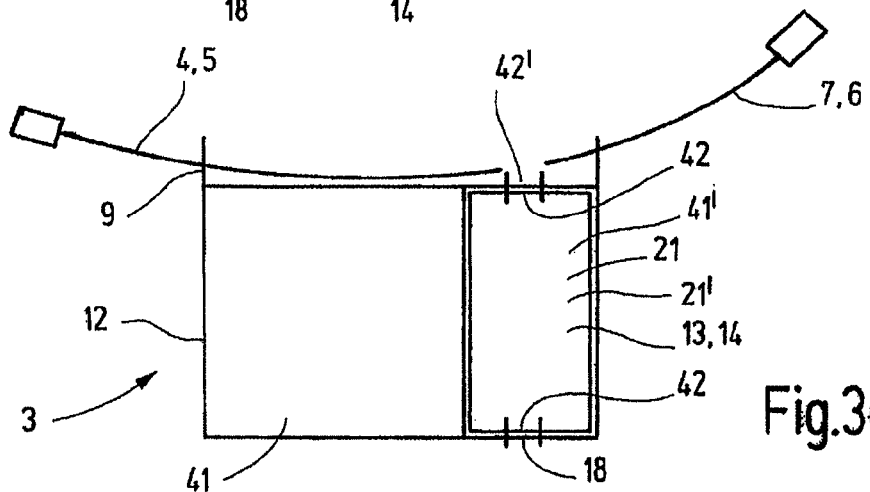

FIGS. 3a and 3b show the embodiment of the dispenser 3 with the intermediate wall 25 from FIG. 2a, with only the differences being discussed here. A plurality of portioning containers 17 which are designed as compartments 17' and are filled by the movement of the animal 1 are located on a lower face of the positioning device 14 which is opposite the intermediate wall 25. However, this filling of the compartments 17' is limited by the size and the number of openings 26 in the intermediate wall 25. If an operator operates the release mechanism 31 by remote control, one of the release openings 18 is opened and the dispenser material 24 is released. FIG. 3b shows an additional vibration device 37 which is fixed to the outside of the housing 12 of the dispenser 3 by means of a connecting element 38 and has an electric drive 39 with which a protruding bolt 40 can be moved to and fro. When activated, the bolt 40 strikes the housing 12 on account of the to-and-fro movement and ensures transportation of the preportioned dispenser material 24 out of the dispenser material receptacle 13 into the portioning container 17 of the portioning device 14. By means of a slide 28', which is not illustrated in FIG. 3b, the preportioned dispenser material 24 passes out of portioning containers 17 into the release region 10 and is released from the dispenser 3. FIG. 3c shows a schematic overall view of a dispenser 3 which is fixed to a fixing harness 6 and, in a region 41, accommodates its electrical components, such as a battery or a storage battery, the electric motor and further components of the electric drive. A further region 41' contains the dispenser material receptacle 13 which is movably mounted and at the same time acts as a portioning device 14. To this end, the dispenser material receptacle 13 has at least one opening 42 which can be arranged such that it is aligned with the release opening 18 in the housing 12 of the dispenser 3 by being moved to a specific position. If the opening 42 is moved over the release opening 18, some of the dispenser material 21 or preportioned dispenser material 24 is released in a portioned manner. The dispenser 3 has a filling opening 42' for filling the dispenser material 21, 24.

Figure 3D:
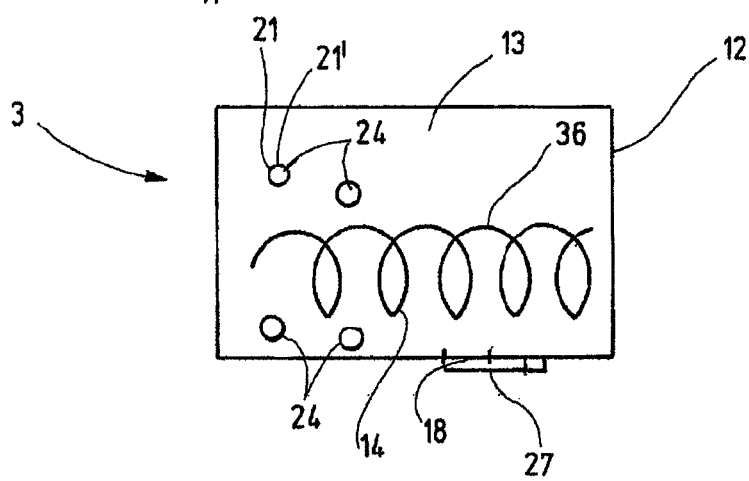

An alternative design of the dispenser is shown in FIG. 3d, in which a spindle 36 transports the preportioned dispenser material 24 from the dispenser material receptacle 13 to the release opening 18 which can be opened/closed by a flap 28.

FIGS. 4a and 4b show a stationary use of the dispenser 3 which, for this purpose, is installed on the wall 43. FIG. 4a shows the dispenser 3 which is fixed to the wall 43 by means of the intermediate element 9 and has two stimulus transmitters 44. The stimulus transmitters emit, for example, an audible stimulus and a visual stimulus at the same time as the dispenser material 21 is released. The release mechanism is operated by the signal transmitter 45 using remote control even in the case of stationary use of the dispenser 3. To this end, the dispenser 3 has a receiver 46. FIG. 4b shows an alternative stationary use, in which the triggering mechanism of the dispenser 3 is triggered by the signal transmitter 45 and dispenser material slides along a guide rail 11, which is designed as a track 47, in the direction of an inlet opening to a box 48 which is securely closed. At the same time, the stimulus transmitter 44 can emit a stimulus (for example visual or audible stimulus). The length of the track 47 can be extended by pulling out an extendable rail 47' and the track specifies a time period which remains available to the animal 1 until the dispenser material 21 or preportioned dispenser material 24 disappears into the box 48 such that it is inaccessible to the animal 1. As an alternative to manual triggering of the signal transmitter 45 by a trainer 49, the release mechanism 31 can, for example, also be triggered by a triggering device 51, which is designed as a position detection device 50, of the signal transmitter 45. This triggering device operates in conjunction with an independent position signal transmitter or a position signal transmitter which is integrated in the dispenser 3. An arrangement of this type can be used to train the senses of the animal 1. In this case, position detection can be performed, for example, by means of an infrared detector, a light barrier, a vibration sensor or a touch sensor.

The dispenser 3 together with the fixing device 4 for animals and the signal transmitter 45 for remote-controlled operation of the release mechanism 31 of the dispenser 3 form the dispenser device 52 (FIG. 4c).

In addition to operation by means of remote control using a signal transmitter 45, the release mechanism 31 can also be triggered manually on the dispenser 3. In addition, further input variables can influence the release of the dispenser material 21, for example the orientation of the dispenser 3, a time switch which is integrated in the dispenser 3 or a device (or an assembly) of the dispenser 3 which influences the release arbitrarily in accordance with the random principle.

In addition to the inventive use of the dispenser 3 on an animal 1, said dispenser can also be used, in addition to its stationary use, on humans or other living creatures.

The dispensers can also be used for the remote-controlled release of medication, other substances and articles in the form of dispenser material 21. On account of the portioning device 14, the dispenser 3 is also suitable for dispensing medication, other substances and articles in a metered manner.

The invention claimed is:

1. A reward dispenser device for releasing a dispenser material for an animal the dispensing device comprising:
   at least one dispenser material receptacle adapted to hold the dispenser material;
   a fixing device adapted for attaching the dispenser material receptacle to the animal for carrying the dispenser device on the animal, the fixing device being a separate fixing harness;
   at least one signal transmitter located away from the animal;
   a release mechanism in communication with the receptacle, the release mechanism being operable remotely, for releasing the or a proportion of the dispenser material, and in that the signal transmitter, which is not to be carried by the animal, is designed for remote-controlled operation of the release mechanism; and
   a collection container for collecting the released dispenser material wherein the collection container can be reached by the animal while the receptacle remains attached to the animal.

2. The dispenser device as claimed in claim 1, characterized in that dispenser material is at least one of a reward food and a toy.

3. The dispenser device as claimed in claim 1, characterized in that the dispenser material is released to the collection container in a region surrounding the animal.

4. The dispenser device as claimed in claim 1, wherein the fixing harness includes a collar for attaching the dispensing device to the animal's neck.

5. The dispenser device as claimed in claim 1, characterized in that the fixing device for animals is a constituent part of the dispenser device and, in particular, remains fixed to the dispenser.

6. The dispenser device as claimed in claim 1, characterized in that the dispenser can be fixed to the fixing device for animals by means of at least one intermediate element in a fixable manner.

7. The dispenser device as claimed in claim 6, characterized in that the intermediate element is a carabiner, a lug or a touch-and-close fastener strip.

8. The dispenser device as claimed in claim 1, characterized in that the remote control operates wirelessly.

9. The dispenser device as claimed in claim 1, characterized in that the signal transmitter has a transmitter and the dispenser has a receiver for remote-controlled operation.

10. The dispenser device as claimed in claim 1, characterized in that the signal transmitter can be operated by a triggering device.

11. The dispenser device as claimed in claim 10, characterized in that the triggering device triggers the signal transmitter as a function of at least one triggering signal wherein the triggering devices is at least one of a manual press of a finger, time switch signal, motion indicator signal and a position detection signal.

12. The dispenser device as claimed in claim 1, characterized in that the dispenser and the signal transmitter are electrically operated and each have at least one electrical storage means for power supply purposes.

13. The dispenser device as claimed in claim 1, characterized in that the dispenser has at least one electric motor for driving the release mechanism.

14. The dispenser device as claimed in claim 1, characterized in that the dispenser material is preportioned dispenser material.

15. The dispenser device as claimed in claim 1, characterized in that the release mechanism is part of a portioning device with which the dispenser material can be released in portions.

16. The dispenser device as claimed in claim 15, characterized in that the portioning device has at least one portioning container.

17. The dispenser device as claimed in claim 15, characterized in that the dispenser material is transported through the portioning device in portions.

18. The dispenser device as claimed in claim 15, characterized in that the portioning device has a spindle for transporting the dispenser material.

19. The dispenser device as claimed in claim 1, characterized in that the dispenser material receptacle has a closable filling opening.

20. The dispenser device as claimed in claim 1, characterized in that the dispenser has at least one stimulus transmitter which emits an additional stimulus to the animal at the same time as the dispenser material or a portion of the dispenser material is released.

21. The dispenser device as claimed in claim 20, characterized in that the stimulus is at least one of a visual stimulus, an audible stimulus, a vibration stimulus, a blast of air and a contact stimulus.

22. The dispenser device as claimed in claim 1, wherein the fixing harness includes a chest harness for attaching the dispensing device to the animal's chest.

23. The dispenser device as claimed in claim 1 further comprising at least one guide wherein the collection container is fitted to the end of the guide so that the dispenser material which is released is conducted along the guide to the collection container.

24. A reward dispenser device for releasing a dispenser material for an animal and operable by a trainer, the dispensing device comprising:
   a dispenser housing sized to be carried by the animal, the housing having a dispenser material receptacle adapted to hold the dispenser material for the animal and a release mechanism for releasing a proportion of the dispenser material, the release mechanism being operable remotely;
   an attachment harness attached to the housing for attaching the housing to the animal so that the housing be carried by the animal; and
   a signal transmitter located away from the animal and not carried by the animal for remote activation of the release mechanism
   wherein the dispenser material is released to region surrounding the animal while the housing remains attached to the animal.

25. The dispenser device as claimed in claim 24 further comprising a collection container in communication with the dispenser housing for collecting the released dispenser material such that the collection container and released dispenser material can be reached by the animal while the housing remains attached to the animal.

26. The dispenser device as claimed in claim 24 wherein the housing further includes a portioning device having at least one portioning container.

27. The dispenser device as claimed in claim 25 further comprising at least one guide wherein the collection container is fitted to the end of the guide so that the dispenser material which is released is conducted along the guide to the collection container.

* * * * *